United States Patent [19]
Yun

[11] Patent Number: 5,526,368

[45] Date of Patent: Jun. 11, 1996

[54] METHOD FOR RECEIVING CALLING DATA EVEN IF MISSING A PREDETERMINED CODE IN A PAGING RECEIVER

[75] Inventor: Young-Han Yun, Suwon, Rep. of Korea

[73] Assignee: SamSung Electronics Co., Ltd., Suwon, Rep. of Korea

[21] Appl. No.: 757,466

[22] Filed: Sep. 10, 1991

[30] Foreign Application Priority Data

Apr. 22, 1991 [KR] Rep. of Korea .................. 1991-6434

[51] Int. Cl.⁶ .................................................. H03M 13/00
[52] U.S. Cl. .................................................. 371/37.1
[58] Field of Search .......................... 371/5.1, 5.3, 5.4, 371/3, 37.1, 4.2; 370/105.1; 375/114, 116

[56] References Cited

U.S. PATENT DOCUMENTS

| | | | |
|---|---|---|---|
| 4,370,753 | 1/1983 | Ehmke ............................ | 455/36 |
| 4,554,540 | 11/1985 | Mori et al. ..................... | 340/825.44 |
| 4,649,538 | 3/1987 | Deluca et al. .................. | 371/22 |
| 4,839,639 | 6/1989 | Sato et al. ..................... | 340/825.44 |
| 4,961,073 | 10/1990 | Drapac et al. .................. | 340/825.44 |
| 5,049,874 | 9/1991 | Ishida et al. ................... | 340/825.44 |
| 5,144,296 | 9/1992 | Deluca et al. .................. | 340/825.44 |
| 5,233,345 | 8/1993 | Ide ................................. | 340/825.44 |

*Primary Examiner*—Hoa T. Nguyen
*Attorney, Agent, or Firm*—Robert E. Bushnell

[57] ABSTRACT

A method for receiving and processing a RF paging signal in a POCSAG code format in a paging receiver having a battery saver function. A paging receiver detects a preamble code, a word synchronization code and subsequent address code of each batch of a received RF paging signal. If an error occurs in the word synchronization code of a next batch, instead of searching for a word synchronization code of the next batch as is disclosed in a conventional paging receiver, a BCH decoding algorithm is used to decode subsequent address code words of the next batch. Thus, if a non-error code word is detected in the code words, the word synchronization code in which an error occurs previously is recognized as the normal word synchronization code and subsequent address code word is searched for. Consequently, even if the word synchronization code in a next batch is missing, at the normal batch construction, the missing word synchronization code can be compensated by the subsequent address code word.

21 Claims, 7 Drawing Sheets

METHOD FOR RECEIVING CALLING DATA EVEN IF MISSING A PREDETERMINED CODE IN A PAGING RECEIVER

FIELD OF THE INVENTION

The present invention relates to a paging receiver having a battery saving function, more particularly to a paging receiver capable of receiving self-calling data even if a word synchronization code is missing from a received RF paging signal.

BACKGROUND OF THE INVENTION

Generally, when using a paging receiver, if a word synchronization code is not detected from a received RF paging signal due to a weak field strength or fading phenomenon, etc., the paging receiver cannot receive self-calling data, i.e., data containing the unique address code of the paging receiver.

Ordinary battery saving circuits are used to minimize power consumption in a RF paging receiver by periodically supplying power instead of continuously. The battery saving function of these battery saving circuits operates in dependence upon detection of an RF carrier. If the RF carrier is found, the battery power is successively supplied to a RF receiving unit of the paging receiver for a predetermined time. This conventional method however has a low battery saving efficiency because all individual receivers within a radio paging system must be activated whenever the RF carrier is found, regardless of which individual paging receiver is intended to be selectively reached. A more advanced battery saving method is to individually receive a RF paging signal in response to a RF carrier in a predetermined call signaling format, but it still suffers similar low battery saving efficiency. The call signaling format widely used exclusively for most paging receivers in the world today is the POCSAG (Post Office Code Standardization Advisory Group) code. POCSAG code is specified in CCIR (International Consultant Commmittee for Radio) recommendation No. 584 to include a preamble code followed by a plurality of batches which respectively indicate call numbers. Each batch begins with a word synchronization code adapted to achieve frame synchronization, followed by code words representative of address and message code words.

In the calling procedure of a conventional paging receiver, if a word synchronization code is not detected, subsequent address code words representative of address and message code words are also not detected. That is, under the operation of a battery saving function, the paging receiver searches for a preamble code (i.e., a first predetermined code) from a received RF paging signal. If the preamble code is found, the paging receiver searches for a word synchronization code (i.e., a second predetermined code) of a first batch. If the word synchronization code is found, subsequent specific address codes representative of a calling number and messages are detected. Thereafter, the paging receiver proceeds to search for a word synchronization code of a next batch. If the word synchronization code of the next batch is not found due to occurrence of errors in the second predetermined code at the next batch, any subsequent address code word is also not detected. This type of a paging receiver is disclosed in U.S. Pat. No. 4,370,753.

Figure 3:
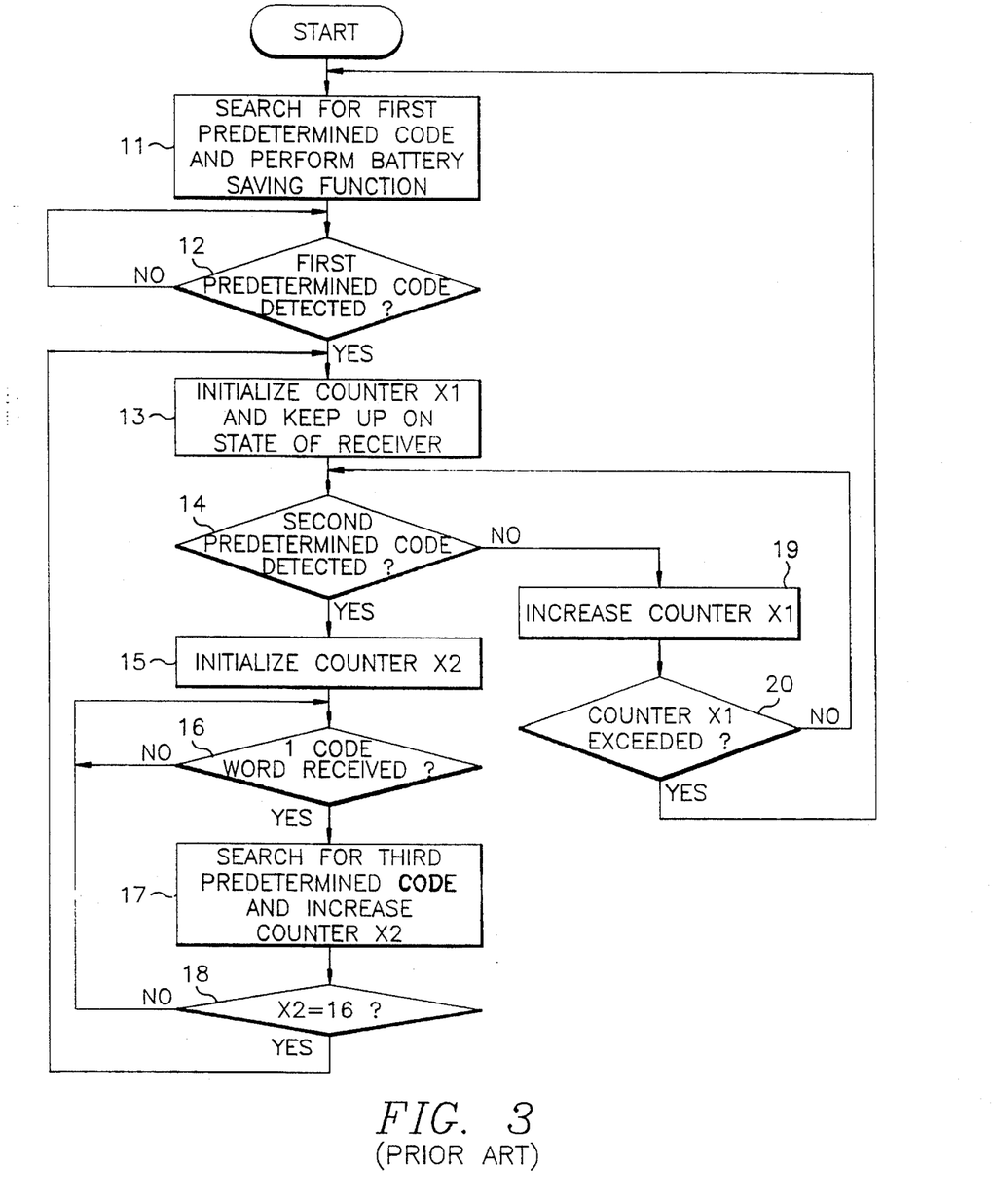
FIG. 3 illustrates a calling procedure of a conventional paging receiver.

Referring to now to FIG. 3, a calling procedure of a conventional paging receiver operating in a battery saving function to receive a RF paging signal in a POCSAG code format is shown. Generally a preamble code (i.e., a first predetermined code) is searched for when the paging receiver is periodically turned on/off. If the preamble code is detected from a received RF paging signal, a word synchronization code (i.e., a second predetermined code) of a first batch is searched for a predetermined time. If the word synchronization code of the first batch is not detected within a predetermined time, the calling procedure returns to the search routine searching for the preamble code again. If, on the other hand, the word synchronization code is detected within a predetermined time, whether a self-address code (i.e., a third predetermined code) is transmitted or not, is found by checking self-frame data from the batch data, the calling procedure then returns to the search routine for searching for a word synchronization code of next batch data.

In more detail, under the operation of a battery saving function, the first predetermined code is searched for in step 11, and is monitored in step 12. If the first predetermined code is not detected, the calling procedure loops in step 12 until the first predetermined code is detected; and if the first predetermined code is detected, the call procedure advances to step 13 where a second predetermined code check counter X1 of the paging receiver is initialized to search for the second predetermined code for a predetermined time, while the battery saving function of the paging receiver is turned off; that is, the receiver circuitry 110 is continuously enabled. This is followed by step 14 where, whether or not the second predetermined code is detected is determined by checking the received batch data. If the second predetermined code is not detected in step 14, the calling procedure proceeds to step 19 to increase the second predetermined code check counter X1, and monitors whether an increased value of the second predetermined code check counter X1 exceeds a predetermined time in step 20. If the increased value exceeds the predetermined time, the calling procedure returns to step 11; and if it does not exceed the predetermined time, the calling procedure returns to step 14.

In step 14, if the second predetermined code is detected, the calling procedure advances to step 15 to initialize a code word counter X2 for checking a number of the received code words in one batch. Next, whether one code word of 32 bit unit has been received or not is checked in step 16. If one code word is received, the calling procedure proceeds to step 17 to search for the self-address code (i.e., the third predetermined code) among predetermined self-frame data and increases the code word counter X2. This is followed by step 18 where the increased value of the code word counter X2 is checked. In step 18, the calling procedure checks whether the value of the code word counter X2 is 16, since each batch of POCSAG data contains a word synchronization code (i.e., second predetermined code) followed by 16 code words. If the value of the code word counter X2 is 16, the calling procedure determines that it is time to receive the second predetermined code of a next batch and returns to step 13. Otherwise, the calling procedure proceeds to step 16.

In the returning process from step 18 to step 13, if an error which cannot be corrected occurs in the second predetermined code; that is, when the second predetermined code is missing from a RF paging signal, the program cannot proceed to step 14. Consequently, subsequent address code cannot be detected. Further, when the word synchronization code is missing, a check routine is continuously repeated for a predetermined time.

As described above, in the calling procedure of a conventional paging receiver, when the word synchronization code is missing, self-calling data cannot be received by the paging receiver.

SUMMARY OF THE INVENTION

It is therefore an object of the invention to provide a method for receiving self-calling data in a paging receiver even if a predetermined code such as a word synchronization code is missing from a RF paging signal in a POCSAG code format.

It is another object of the invention to provide a paging receiver which can improve reception efficiency even if the paging receiver is used in an area of weak field strength or where a fading phenomenon is generated.

According to an aspect of the present invention, instead of searching for a word synchronization code of a next batch of a received RF paging signal in a POCSAG code format, BCH (Bose-Chaudhum-Hocquenghem) decoding is employed to decode the next batch of POCSAG data by an BCH decoding algorithm. Thus, if no error is detected in the address code words subsequent to the word synchronization code in one batch, a word synchronization code in which an error occurs previously is recognized as a normal word synchronization code and predetermined address code words are searched for. Consequently, even if the word synchronization code is missing in the normal batch construction, the missing word synchronization code can be compensated by the subsequent address code words.

BRIEF DESCRIPTION OF THE DRAWINGS

The above objects and other advantages of the present invention will become more apparent by describing in detail the preferred embodiment of the present invention with the reference to the attached drawings, in which.

DETAILED DESCRIPTION OF THE PREFERRED EMBODIMENT

Figure 1:
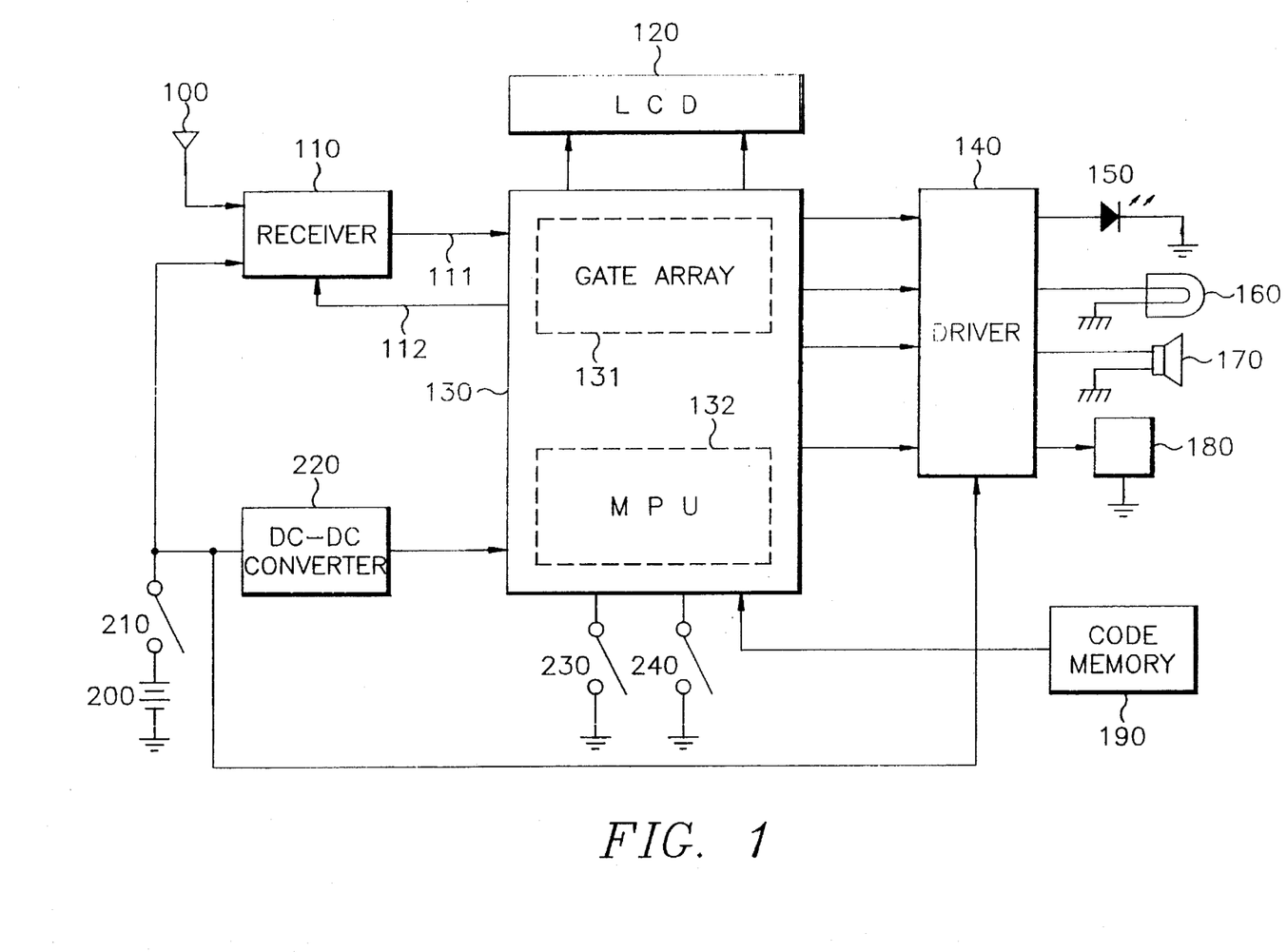
FIG. 1 is a block diagram of a paging receiver according to the present invention.

Referring to FIG. 1, an, antenna 100 picks up a modulated RF signal for supplying the modulated signal to a receiver 110. Receiver 110 is periodically driven under control of a battery saving signal provided by decoder 130 through a battery saving signal line 112 in order to minimize power consumption. Upon reception of the battery saving signal, receiver 110 demodulates the RF signal received from the antenna 100 to produce logic level data through a data reception line 111. Decoder 130 is coupled to receive the logic level data output from the receiver 110, for decoding the logic level data received through line 111. A read only code memory 190 stores self-address code unique to the pager therein and is nead, by the decoder 130. In more detail, the decoder 130 reads an address code in a form of CAP (Customer Administration Panel) code stored in the code memory 190 and checks whether the logic level data output from the receiver 110 contains the unique address code of the pager. If the logic level data contains the unique address code of the pager, it is judged as a proper calling signal, the decoder 130 then displays the received messages on the LCD (Liquid Crystal Display) 120, and stores the received messages in a message memory. In this case, the message memory is included in a MPU (Micro Processor Unit) 132 since one chip processor of 4 bits is used in this invention. The decoder 130 drives an alert circuit (i.e., a speaker 170 or a vibrator 180) through a driver 140 in response to the received calling information. A call indicator 150 is driven in response to an on/off period of the alert signal and a lamp 160 is for back-lighting the LCD 120. The decoder 130 has also a memory/normal mode selection switch 240 for selecting speaker 170 or vibrator 180, and a read key switch 230 for forcing speaker 170 or vibrator 180 to stop, and for recalling received messages stored in memory of the MPU 132. A converter 220 produces a power voltage for use in decoder 130 using a battery 200 which has a limited power capacity. A switch 210 opens and closes the circuit with battery 200 to enable electrical power from battery 200 to be provided to the pager or, when switch 210 is opened, to interrupt supply of power to the pager.

Decoder 130 comprises a gate array 131 and the MPU 132.

Figure 2:
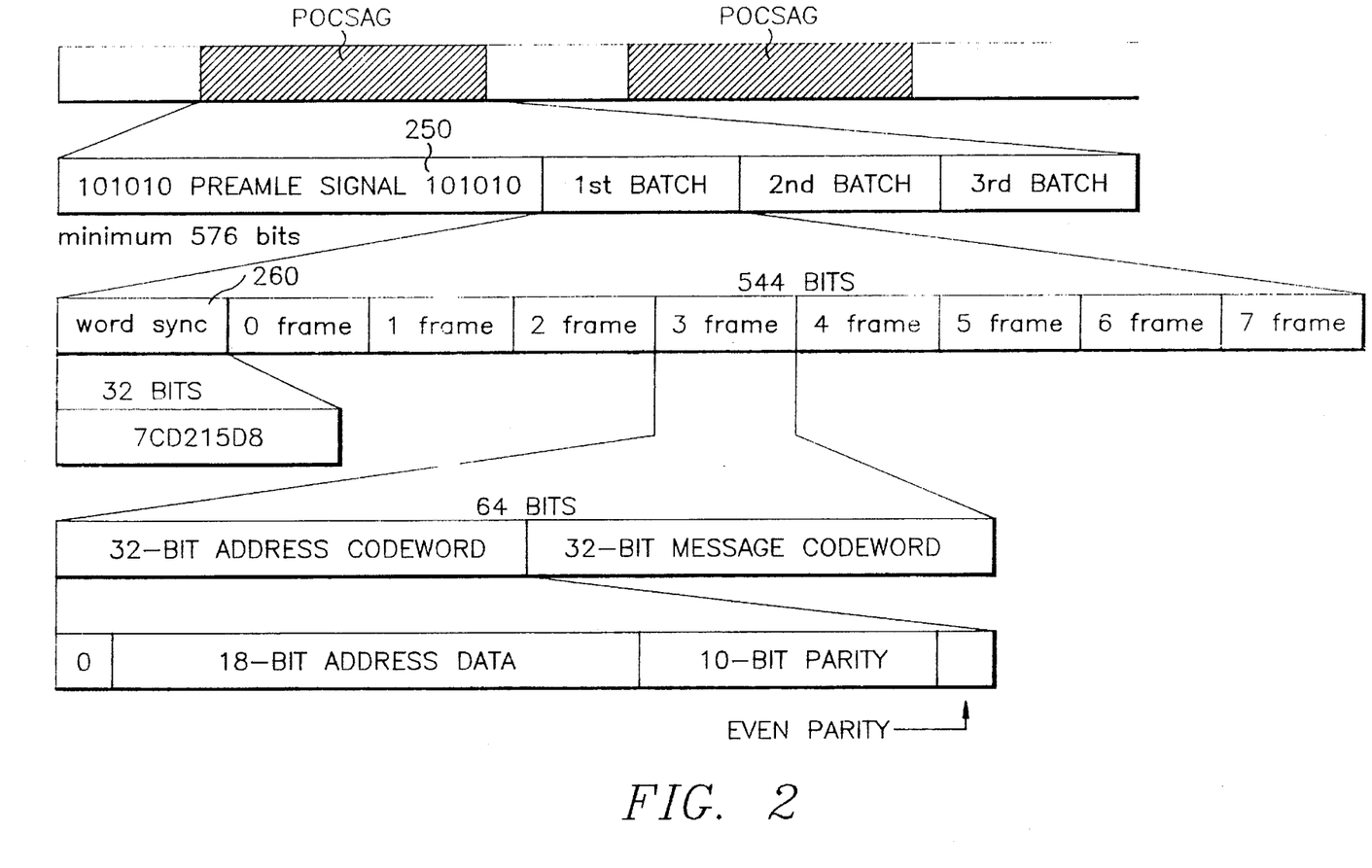
FIG. 2 illustrates a RF paging signal in a POCSAG code format according to the present invention.

Referring to FIG. 2, a preamble signal 250 from the POCSAG code signal is used to establish bit synchronization between the received POCSAG code signal and the paging receiver. In this invention, the preamble signal 250 is called a first predetermined code. A word synchronization code 260 is used to adjust the word synchronization of code words which consist of an address, a message and an idle code signal. The word synchronization code is called a second predetermined code in this invention. The first predetermined code is an inverted signal of "101010" and has at least 576 bits according to the POCSAG standard for the operation of a battery saving circuit. This is for receiving the first predetermined code by supplying the battery saving signal (for example, 64 bits turning on and 512 bits turning off) to the receiver 110 when detecting the first predetermined code in the decoder 130, even if the receiver 110 is turned on or off.

As shown in FIG. 2, POCSAG code is constructed in a batch structure of selective call message with each batch of data consists of a word synchronization code (i.e., a second predetermined code) of 32 bits and 8 frames. Each individual frame consists of two code words. The code words are classified into an address code word representing a calling number and a message code word representing a message. It will be appreciated that the batch structure is composed of 17 code words. Each individual code has 32 bits representing either the word synchronization code, address, message or idle codes. Each individual code also consists of 21 information bits, an even parity bit and 10 BCH parity bits used for the BCH-decoding of the 21 information bits.

An aforementioned BCH (Bose-Chaudhum-Hocquenghem) encoding algorithm is processed by the generation of [31,21 BCH+parity] code word specified by the POCSAG code signal. Each code word has 21 information bits connected to a polynomial coefficient $X^{31}$ through $X^{11}$. A syndrome table is made by dividing the polynomial coefficient by a predetermined syndrome generating polynomial $(X^{10}+X^9+X^8+X^6+X^5+X^3+1)$ by means of a modulo-2 method. A calculated syndrome table corresponding to the respective information of 21 bits is as follows.

TABLE 1

| BIT NO. 1 | SYNDROME VALUE |
| --- | --- |
| X31 | 1110110100 |
| X30 | 0111011010 |
| X29 | 0011101101 |
| X28 | 1111000010 |
| X27 | 0111100001 |
| X26 | 1101000100 |
| X25 | 0110100010 |
| X24 | 0011010001 |
| X23 | 1111011100 |
| X22 | 0111101110 |
| X21 | 0011110111 |
| X20 | 1111001111 |
| X19 | 1001010011 |
| X18 | 1010011101 |
| X17 | 1011111010 |
| X16 | 0101111101 |
| X15 | 1100001010 |
| X14 | 0110000101 |
| X13 | 1101110110 |
| X12 | 0110111011 |
| X11 | 1101101001 |

The syndrome value corresponding to the respective information bit can generate 10 bits from a maximum $X^9$ to a minimum $X^0$ based upon the division of the polynomial by the polynomial $(X^{10}+X^9+X^8+X^6+X^5+X^3+1)$ by means of the modulo-2. Thus, the respective syndrome table is composed of 10 data bits.

In the transmitter, the information bit of 21 bits to be transmitted is added to tile BCH parity bit of 10 bits generated after the BCH-encoding of the information bit of 21 bits using the syndrome table of the Table-1. Thus, data of 31 bits is provided along with all even parity, bit of 1 bit. Accordingly, a code word of 32 bit unit is transmitted as a batch structure. While, in the paging receiver, the BCH parity is again made by BCH-decoding the received code word using the syndrome table of the Table-1. Then, the presence/absence of errors and the need for correction thereof are judged on the basis of the BCH parity bit and the received parity bit.

The BCH decoding method in the paging receiver may be performed by either software or hardware. In accordance with the present invention, since a microprocessor chip HD4OL4808H 132 of 4 bits is used in the decoder 130, the decoding method by software is preferred over hardware. Further, errors of various bits can be corrected by the combination of the Table-1, however, in this invention, errors up to 2 bits (including random and burst) may be corrected.

In the preferred embodiment of the present invention so far described, each batch data is checked by using the BCH decoding algorithm. Since the word synchronization, address, message and idle code words of the POCSAG code are all constructed with a BCH [31, 21+parity] structure, the presence/absence of errors is checked by the BCH decoding algorithm as shown in FIG. 4 instead of searching for the second predetermined code (i.e., the word synchronization code) as shown in FIG. 3 of the conventional art.

Figure 4A:
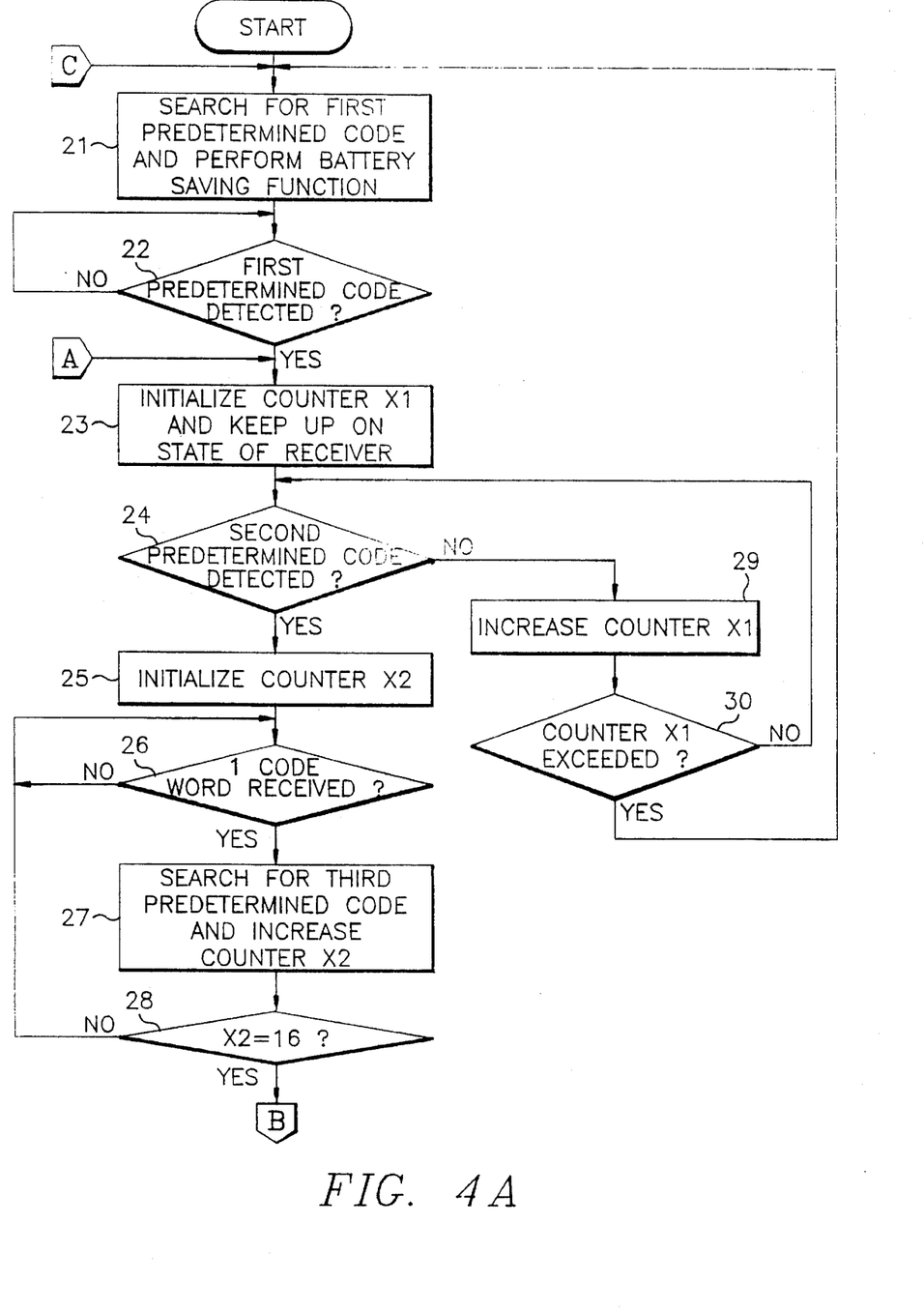
FIGS. 4A to 4C illustrates a calling procedure of a paging receiver according to the present invention.
Figure 4B:
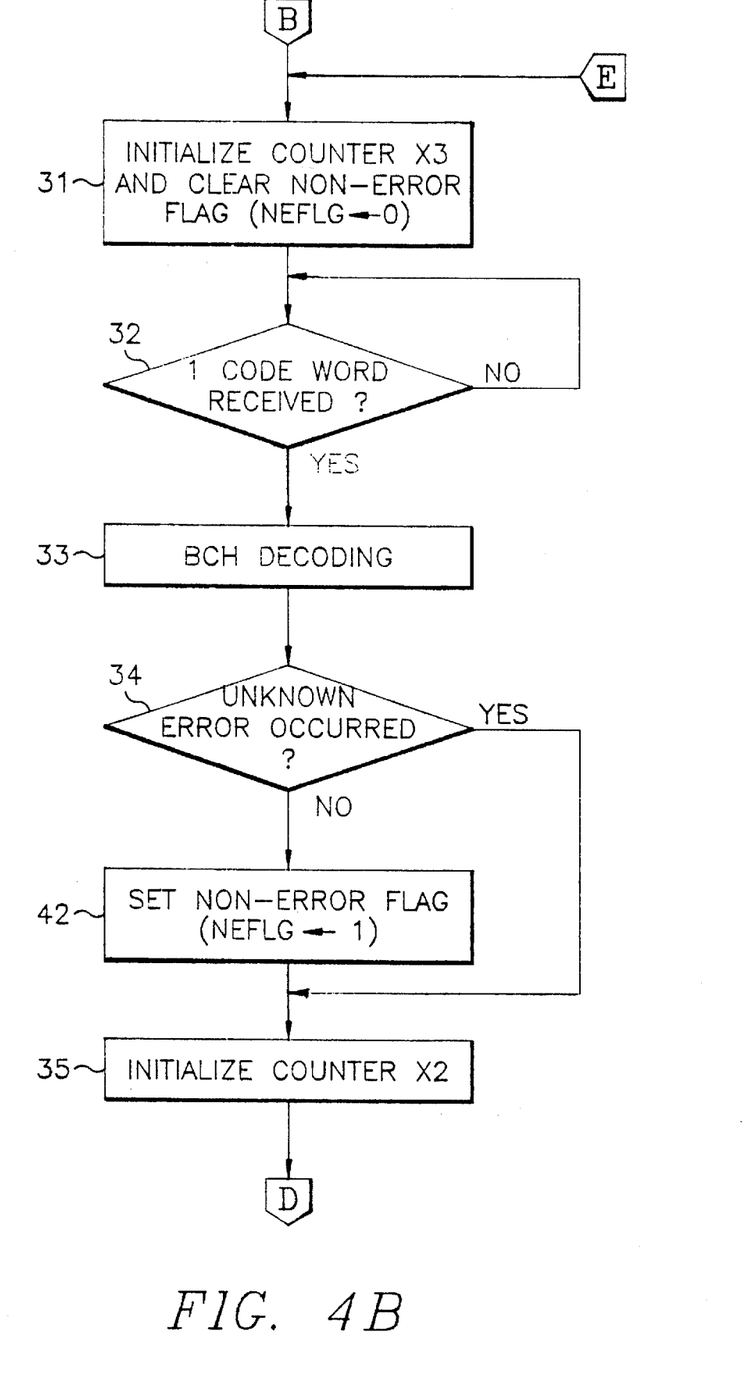
Figure 4C:
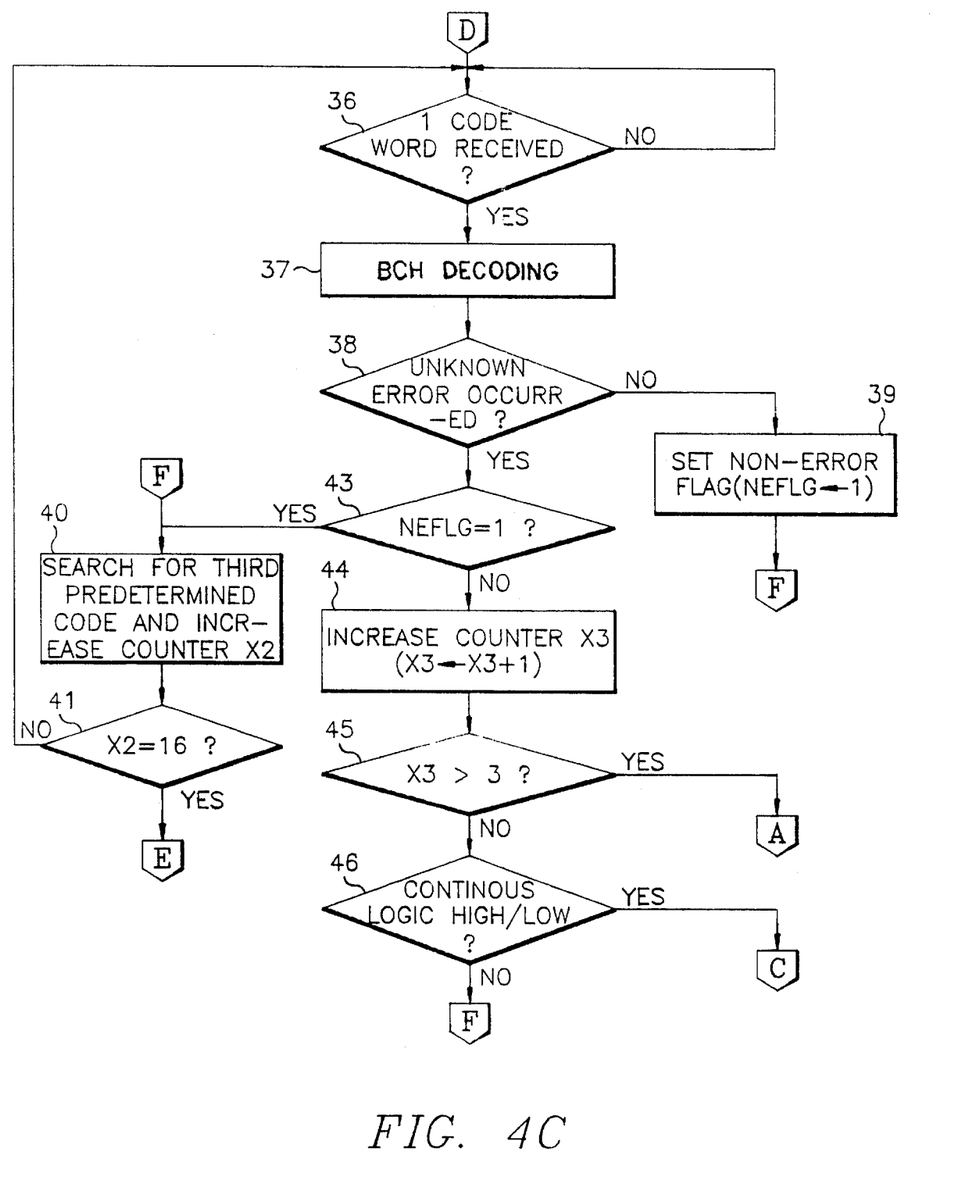

Referring now to FIGS. 4A to 4C, a BCH error counter X3 is utilized for accumulating a number of BCH errors which occur. Moreover, it should be appreciated that the battery saving function according to the present invention is to use POCSAG code and the POCSAG code is originally constructed to perform the battery, saving function.

Referring to FIG. 4A, under the operation of a battery saving function, a first predetermined code is searched for in step 21, and is monitored in step 22 whether the first predetermined code is detected or not. If the first predetermined code is not detected, the calling procedure loops in step 22 until the first predetermined code is detected; and if the first predetermined code is detected, the program advances to step 23. In step 23, a second predetermined code check counter X1 is initialized to check for the second predetermined code only during a preparation time, and the battery saving function of the paging receiver is turned-off; that is, the receiver is continuously turned on. This is followed by step 24 where whether or not the second predetermined code is detected is determined by checking the received batch data. If the second predetermined code is not detected in step 24, the program proceeds to step 29 to increase the second predetermined code counter X1, and monitors whether an increased value of the second predetermined code check counter X1 in step 29 exceeds a predetermined time value in step 30. If the increased value exceeds the predetermined time value, the program returns to step 21; and if the increased value does not exceed the predetermined time value, the program returns to step 24.

In step 24, if the second predetermined code is detected, the program advances to step 25 to initialize a code word counter X2 for checking a number of the received code words in one batch. Next, whether one code word of 32 bit unit has been received or not is checked in step 26. If one code word has been received, the program proceeds to step 27 to search for a self-address code (i.e., a third predetermined code) among the predetermined self-frame data and increase the code word counter X2. This is followed by step 28 where the program determines whether it is time to receive a second predetermined code of a next batch from a received RF paging signal, by checking the increased value of the code word counter X2. In step 28, the program checks whether the value of the code word counter X2 is 16, since 16 is a total number of code words contained in one batch. If the value of the code word counter X2 is 16, the program determines that it is time to receive the second predetermined code of a next batch and proceeds to step 31 of FIG. 4B. Otherwise, the program returns to step 26 of FIG. 4A.

In the conventional system, if the program determines that it is time to receive the second predetermined code of a next batch, step 28 is always followed by step 23 to search for the second predetermined code. However, in the present invention step 28 is followed by step 31 to overcome the deficiencies of the conventional pager. From step 31, the processes of searching for a dummy synchronization code are performed by using the above-mentioned BCH decoding algorithm.

A BCH error counter X3 is increased by one whenever an unknown error, i.e., an error which cannot be corrected, occurs after BCH-decoding one code word. In step 31, BCH error counter X3 is initialized (X3=0), and a non-error flag NEFLG, which shows the reception of a non-error code word data is cleared (NEFLG=0). This is followed by step 32 of FIG. 4B where whether one code word of 32 bits, representing the second predetermined code of a next batch, has been received or not is monitored. If the code word of 32 bits is received, the program advances to step 33 of FIG. 4B, to BCH-decode the code word of 32 bits. If the code word of 32 bits representing the second predetermined code of a next batch is not received, the program returns to step 32. Next, in step 34 of FIG. 4B, whether an error which cannot be corrected occurs as a result of the BCH decoding in step 33 is checked. If the error doesn't occur as the result of the BCH decoding or the error occurs but can be corrected, the program proceeds to step 42 to set the non-error flag NEFLG (NEFLG=1) and then proceeds to step 35 of FIG. 4B. If the error which cannot be corrected occurs in step 34, the program proceeds directly to step 35.

In steps 35, 36, 40 and 41, the processes similar to the conventional art checking self-frame data in the batch data are performed. That is, the code word counter X2 for counting the number of the received code words in the batch data is also initialized (X2–0). Then, whether or not one code word of 32 bit unit has been received is determined in step 36 of FIG. 4C. If the code word of 32 bits is received, the program to step 37 of FIG. 4C to BCH-decode the code word of 32 bits. In step 38 of FIG. 4C, whether the error which cannot be corrected occurs is checked. If the error which cannot be corrected occurs, the program proceeds to step 43 of FIG. 4C, to check the non-error flag NEFLG which shows the reception of non-error data or an error code word capable of being corrected. If non-error data or an error code word capable of being corrected is received, the program proceeds to step 40 of FIG. 4C. Otherwise, the program goes to step 44 of FIG. 4C to increase the BCH error counter X3 by one.

Then, in step 45 of FIG. 4C, whether the increased value of the BCH error counter X3 is more than 3; that is, the code word which cannot be corrected is continuously received more than three times is checked. If the code word which cannot be corrected is continuously received more than three times, the program returns to step 23 of FIG. 4A to search for the second predetermined code. Otherwise, the program proceeds to step 46 of FIG. 4 C to check if the received code word of 32 bits maintains a continuous logic state of "high" or "low." If all 32 bits in one of the received code words in the batch data are judged as logic "high" or "low", the program returns to the step 21 of FIG. 4A to search for the first predetermined code because no data is to be received. Otherwise, the program advances to step 40. In step 38, if a non-error or an error capable of being corrected occurs, the program advances to step 39 of FIG. 4C to set the non-error flag NEFLG. In this case, it is confirmed that the batch data which does not contain error has been received. In step 40, the self-address code (i.e., line third predetermined code) among the predetermined self-frame data is searched for arid the code word counter X2 is increased. This is followed by step 41 of FIG. 4C to see if it is time to receive a second predetermined code of a next batch by checking whether the increased value of the code word counter X2 is 16, since 16 is a total number of code word contained in one batch. If it is time to receive the next batch, the program returns to step 31 of FIG. 4B. Otherwise, the program returns to step 36 to receive the next code word.

In step 18 of the conventional pager as shown in FIG. 3, if it is the time to receive the second predetermined code of the next batch, the program returns to step 13 to search only for the second predetermined code. While, if the second predetermined code is not detected, step 15 is not performed. However, according to the present invention as shown in FIG. 4, in step 28, if it is the time to receive the second predetermined code of the next batch, the program advances to step 31 to initialize the BCH error counter X3 and clear non-error flag NEFLG. Then, instead of searching for the second predetermined code of a next batch as is disclosed in the prior art, the synchronization of dummy frame is checked by checking errors in the BCH decoding. Consequently, if batch data which cannot be decoded is received as a result of the fading phenomenon in the second predetermined code of the POCSAG signal, the program proceeds to step 35 of FIG. 4B to check the code words in the batch data. Thus, unless at least one among three code words in the batch data is received without an error as shown in step 45 of FIG. 4C, the program recognizes that the frame synchronization is to be adjusted. Therefore, even if the second predetermined code is missing, the batch data can still be detected.

Figure 5A:
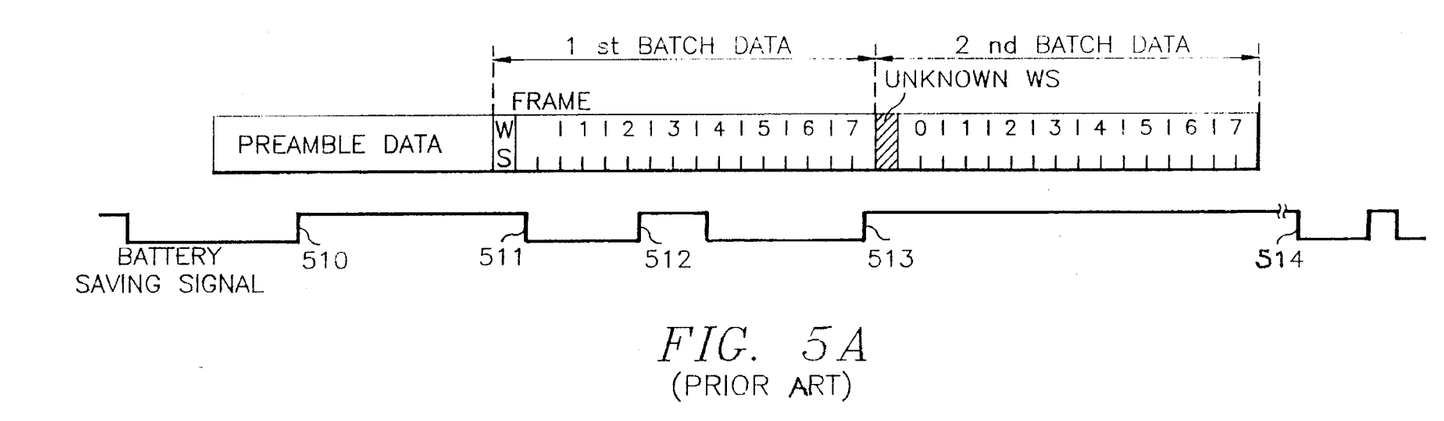
FIGS. 5A and 5B are timing charts for showing the calling procedures of the conventional paging receiver and the paging receiver of the present invention.
Figure 5B:
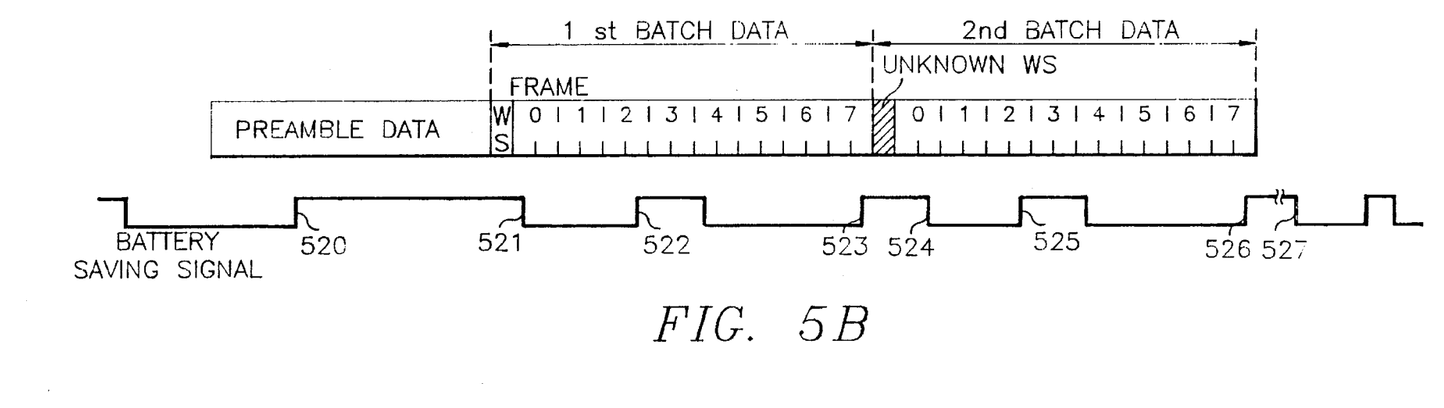

Referring to FIGS. 5A and 5B, they are timing charts for showing a difference the present invention and the prior art according to a receiving form. FIGS. 5A and 5B have a same transmitted data format and show a difference when a code which cannot be corrected is randomly made on second batch data and is transmitted. FIG. 5A shows a timing chart of a calling procedure according to prior art. In FIG. 5A, before preamble data is received, while performing a battery saving function with a predetermined period, the data is received. If a first predetermined code is checked at time slot 510, a second predetermined code is searched for and the second predetermined code is checked at time slot 511. Then, self-frame data in the batch data is received at time slot 512. Thereafter, the last frame data, that is 16th code word, is checked and the second predetermined code of the next batch is searched for at time slot 513. In this case, since the unknown code is forcibly transmitted, the second predetermined code is not detected and the detection of the second predetermined code is continuously carried out for a predetermined time. Then, at time slot 514, the program proceeds to again search for the first predetermined code. Therefore, self-calling address transmitted on self-frame in the second batch cannot be received.

In FIG. 5B, the processes up to the first batch data is same its that of FIG. 5A. After checking the last frame data of the first batch, the error is checked by the BCH decoding algorithm instead of searching for the second predetermined code at the starting point of the second batch data. Then, since an unknown error occurs at the word synchronization code of the second batch and there is no error as a result of BCH decoding of the code words of the second batch, the processes of the predetermined batch data is performed at time slot 524. Therefore, the transmitted self-address code can be received.

As described above, in the case that the second predetermined code is suddenly missing because of a fading phenomenon, etc., self-calling data can be received and the reception efficiency can be improved.

While the invention has been particularly shown and described with the reference to the preferred embodiment of the present invention thereof, it should be appreciated by those skilled in the art that the foregoing and other changes in form and detail may be made without departing from the spirit and scope of the present invention.

What is claimed is:

1. A method for processing paging signals received by a paging receiver, said paging signals having a predetermined signaling format comprising a preamble code followed by a plurality of successive batches, each batch comprising a word synchronization code followed by a plurality of successive frames, each frame comprising two code words, said method comprising the steps of:

detecting the preamble code of said paging signals;

detecting a word synchronization code of a first batch subsequent to said preamble code and making a first count of code words in said first batch;

decoding a word synchronization code of a second batch subsequent to said first batch and checking whether an error occurs in the decoded word synchronization code of said second batch, when said first count reaches a first predetermined number;

when the error occurs in said decoded word synchronization code of said second batch, decoding the code words of said second batch and checking whether an error occurs in each of the decoded code words of said second batch;

when the error does not occur in said decoded word synchronization code of said second batch, making a second count of the code words in said second batch;

when the error occurs in decoded code words of said second batch, checking whether a number of errors occurring in each decoded code word is less than a second predetermined number;

making said second count of the code words in said second batch when the number of errors in a decoded code word is less than said second predetermined number;

returning to the preamble code detection step when a decoded code word in said second batch represents data having a continuous logic state, and the number of errors is not less than said second predetermined number; and making said second count of the code words in said second batch when a decoded code word in said second batch does not represent said data having said continuous logic state, and the number of errors is not less than said second predetermined number.

2. The method as claimed in claim 1, wherein said two code words of each frame represent address and message code words.

3. The method as claimed in claim 1, further comprised of said step of decoding said word synchronization code enabling said paging receiver to have frame synchronization with said paging signals, and said said decoding step uses a Bose-Chaudhum-Hocquenghem decoding algorithm.

4. The method as claimed in claim 1, wherein said first predetermined number is sixteen, and said second predetermined number is three.

5. A method for processing POCSAG data received by a paging receiver, said POCSAG data comprising a preamble code followed by a plurality of successive batch data, each batch data comprising a word synchronization code followed by a plurality of successive frame data, each frame data comprising two code words representative of messages from a caller, said method comprising the steps of:

detecting said preamble code from said POCSAG data;

detecting a word synchronization code of a first batch data subsequent to said preamble code and making a first count of code words in said first batch data upon detection of said preamble code;

decoding a word synchronization code of a second batch data subsequent to said first batch data and checking whether an error occurs in the decoded word synchronization code of said second batch data, when said first count reaches a first predetermined number;

when the error occurs in said decoded word synchronization code of said second batch data, decoding the code words of said second batch data, and checking whether an error occurs in the decoded code words of said second batch data;

when the error does not occur in one of said decoded code words of said second batch data, making a second count of said decoded code words in said second batch data;

when the error occurs in said decoded code words of said second batch data, checking whether a number of said decoded code words in which the error occurs is greater than a second predetermined number;

determining whether said decoded code words in said second batch data represent data having a continuous logic state, when the number of decoded code words in which the error occurs is not greater than said second predetermined number;

returning to detecting a word synchronization code of a next batch data subsequent to said second batch data, when the number of decoded code words in which the error occurs is greater than said second predetermined number; and returning to detecting said preamble code from said POCSAG data when a said decoded code word of said second batch data is determined to represent data having said continuous logic state, and making said second count of the decoded code words in said second batch data when said code words in said second batch data are not determined to represent data having a continuous logic state.

6. A method for processing POCSAG data received by a paging receiver, said POCSAG data comprising a preamble code followed by a plurality of batches of data, each batch of data comprising a word synchronization code followed by a plurality of code words representing messages from a caller, said method comprising the steps of:

detecting said preamble code from said POCSAG data;

detecting a word synchronization code of a first batch of data from said plurality of batches of data subsequent to said preamble code and making a first count of code words in said first batch of data;

receiving a word synchronization code of a second batch of data subsequent to said first batch of data when said first count reaches a first predetermined number;

decoding said word synchronization code of said second batch of data, and checking whether an error occurs in the decoded word synchronization code of said second batch of data;

receiving and decoding successive code words contained in said second batch of data, and checking whether an error occurs in the decoded successive code words contained in said second batch of data;

when the error occurs in one of said word synchronization code and said decoded successive code words and said error is correctable, making a second count of said decoded successive code words in said second batch of data;

when the error occurs in said decoded successive code words and is uncorrectable, determining whether a total number of said decoded successive code words in which the uncorrectable error occurs is greater than a second predetermined number;

when the total number is greater than said second predetermined number, returning to detecting a said word synchronization code of a next batch of data subsequent to said second batch of data; and determining logic states of said decoded successive code words contained in said second batch of data, and either returning to detecting said preamble code from said POCSAG data, or returning to making said second count of said decoded successive code words contained in said second batch of data, in dependence upon said determination of said logic states of said decoded successive code words.

7. The method as claimed in claim 6, wherein each batch of data comprises sixteen code words, and said first predetermined number corresponds to the total number of the code words contained in each batch of data.

8. The method as claimed in claim 6, wherein said first predetermined number is sixteen and said second predetermined number is three.

9. A communication system, comprising:

means for receiving calling data transmitted via radio signals from a paging terminal, said calling data comprising a preamble code followed by a plurality of successive batch data, each batch data comprising a word synchronization code followed by a plurality of successive frame data, each frame data comprising two successive code words representing messages transmitted by a caller via said paging terminal; and processing means processing said calling data received by said receiving means by:

detecting said preamble code from said calling data;

detecting a word synchronization code of first batch data of said plurality of successive batch data immediately subsequent to said preamble code and making a first count of code words in said first batch data;

decoding a word synchronization code of second batch data of said plurality of successive batch data immediately subsequent to said first batch data and checking whether an error occurs in said decoded word synchronization code of said second batch data, when said first count reaches a first predetermined number;

receiving and decoding successive code words contained in said second batch data, and checking whether errors occur in the decoded successive code words of said second batch data;

when the errors do not occur in said decoded successive code words of said second batch data, alternatively, when the errors occur in said decoded successive code words of said second batch data and said errors are correctable by said processing means, making a second count of said decoded successive code words in said second batch data;

when the errors occur in said decoded successive code words of said second batch data and said errors are not correctable, checking whether a counted number of decoded said code word in which said errors occur and are not correctable is greater than a second predetermined number;

returning to detecting said word synchronization code of a next batch data subsequent to said second batch data, when the counted number is greater than said second predetermined number;

determining whether said decoded successive code words represent data having a continuous logic state, when the counted number is not greater than said second predetermined number;

returning to detecting said preamble code of said calling data, when one of said decoded successive code words of said second batch data is determined to represent data having said continuous logic state; and making said second count of said decoded successive code words in said second batch data, when said decoded successive code words of said second batch data do not represent data having said continuous logic state.

10. The communication system of claim 9, further comprised of said processing means processing said calling data received via said receiving means by a bose-chaudhum-hocquenghem decoding scheme.

11. The communication system as claimed in claim 9, wherein said first predetermined number is sixteen and said second predetermined number is three.

12. A pager, comprising:

receiving means for receiving calling data transmitted via radio signals from a paging terminal, said calling data comprising a preamble code followed by a plurality of successive batches of data, each batch of data comprising a word synchronization code followed by a plurality of frame data;

processing means for securing reception of said calling data from said receiving means and processing received calling data for a subsequent visual display of messages in correspondence with said received calling data, said processing means securing reception of said calling data by:

detecting said preamble code from said received calling data;

detecting a word synchronization code of a first batch of data from said plurality of successive batches of data subsequent to said preamble code and making a first count of successive frame data contained in said first batch of data;

receiving a word synchronization code of a second batch of data from said plurality of successive batches of data subsequent to said first batch of data, when said first count reaches a first predetermined number;

decoding said received word synchronization code of said second batch of data and checking whether an error occurs in the decoded word synchronization code of said second batch of data;

receiving and decoding frame data contained in said second batch of data, and checking whether errors occur in the decoded frame data contained in said second batch of data;

making said second count of successive frame data contained in said second batch of data, when the errors occur in the decoded frame data and said errors are correctable;

determining whether a total number of the decoded frame data in which uncorrectable errors occur is greater than a second predetermined number, when said errors occur in the decoded frame data and said errors are not correctable;

returning to detecting a said word synchronization code of a next batch of data subsequent to said second batch of data, when said total number is greater than said second predetermined number;

making a determination of logic states of the decoded frame data contained in said second batch of data, and returning to one of detecting said preamble code from said calling data, and of making said second count of said successive frame data contained in said second batch of data in dependence upon said determination.

13. The pager of claim 12, wherein each frame data contains two successive code words representing said messages transmitted by a caller, and said first predetermined number is set to correspond to a total number of the code words within each batch of said plurality of batches of data.

14. The pager of claim 12, wherein said first predetermined number is sixteen and said second predetermined number is three.

15. A method for processing calling data received by a pager, said calling data comprising preamble data followed by plurality of successive batch data, each batch data comprising word synchronization data followed by plurality of successive frame data representing messages from a caller, said pager including a first counter for counting a number of successive frame data contained in each batch data, and a second counter for counting a number of errors occurring in each batch data, said method comprising the steps of:

detecting said preamble data from said calling data;

detecting word synchronization data of first batch data of said plurality of successive batch data subsequent to said preamble data;

initializing said first counter and enabling said first counter to make a first count of successive frame data in said first batch data upon detection of said word synchronization data of said first batch data;

initializing said second counter, when said first count reaches a first predetermined number;

receiving and decoding word synchronization data of second batch data subsequent to said first batch data;

determining whether an error occurs in the decoded word synchronization data of said second batch data;

re-initializing said first counter after determining whether an error occurs in the decoded word synchronization data of said second batch data;

receiving and decoding successive frame data of said second batch data subsequent to said first batch data;

determining whether errors occur in the decoded successive frame data of said second batch data;

enabling said first counter to make a second count of the decoded successive frame data in said second batch data, when the errors occur in the decoded word synchronization data and the decoded successive frame data of said second batch data but said errors are correctable;

re-initializing said second counter, receiving and decoding word synchronization data of third batch data subsequent to said second batch data, when said second count reaches said first predetermined number;

enabling said second counter to make a third count of errors occurring in said second batch data, when the errors occur in the decoded word synchronization data and the decoded successive frame data of said second batch data but said errors are not correctable;

returning to detecting said word synchronization data of said third batch data, when said third count reaches a second predetermined number;

making a determination of logic states of said decoded successive frame data in said second batch data, when said third count does not reach said second predetermined number; and returning to detecting said preamble data from said calling data, or alternatively, returning to enabling said first counter to make said second count of the decoded successive frame data in said second batch data in dependence upon said determination.

16. The method of claim 15, further enabling said first counter to make said second count of the decoded successive frame data in said second batch data, when no error occurs in said decoded successive frame data of said second batch data.

17. The method of claim 15, wherein said first predetermined number is sixteen and said second predetermined number is three.

18. A method for processing calling data received by a pager, said calling data comprising preamble data followed by plurality of successive batch data, each batch data comprising a word synchronization code followed by plurality of successive frame data representing messages from a caller, said method comprising the steps of:

detecting said preamble data from said calling data;

detecting a word synchronization code of first batch data of said plurality of successive batch data subsequent to said preamble data;

making a first count of successive frame data in said first batch data upon detection of said word synchronization data of said first batch data;

decoding a word synchronization code and successive frame data of second batch data subsequent to said first batch data, when said first count reaches a first predetermined number;

determining whether errors occur in the decoded word synchronization code and the decoded successive frame data of said second batch data;

making a second count of the decoded word synchronization data and the decoded successive frame data contained in said second batch data in which errors occur;

returning to detecting a said word synchronization code of third batch data subsequent to said second batch data, when said second count reaches a second predetermined number; and alternatively, repeating decoding a word synchronization code and successive frame data of said third batch data subsequent to said second batch data, when said second count does not reach said second predetermined number.

19. A paging receiver for receiving and processing paging signals comprising a plurality of predetermined codes, said paging receiver comprising:

receiving means for receiving said paging signals comprising said plurality of predetermined codes in response to reception by said receiving means of a power saving signal;

control means for processing received paging signals for enabling a subsequent visual display of messages corresponding to said received paging signals and controlling said receiving means by providing said power saving signal, said control means comprising detecting means for:

detecting a preamble code of said a received said paging signals, and then detecting a synchronization code in a first batch of said received paging signals subsequent to detection of said preamble code;

decoding a synchronization code and word codes representing said messages in a next batch of said paging signals received subsequent to said first batch, and checking whether an error occurs during said decoding;

detecting said word codes representing said messages in said next batch for enabling said subsequent visual display of said messages, when the error does not occur during said decoding, or alternatively when said error occurs but is correctable; and detecting one of said preamble code of said received paging signals and said synchronization code in a batch received subsequent to said next batch when said error is not correctable.

20. A method for processing paging signals received by a paging receiver, each of said paging signal having a predetermined signaling format comprising a preamble code followed by a plurality of successive batches of data, each batches of data, each batch comprising a word synchronization code followed by a plurality of successive frames, each frame comprising two code words, said method comprising the steps of:

detecting a preamble code of paging signals;

when said preamble code of said paging signals has been detected, detecting a word synchronization code of a first batch subsequent to the preamble code and then detecting and counting the code words in the first batch;

decoding a word synchronization code of a second batch subsequent to the first batch and checking for errors in the decoded word synchronization code of the second batch;

when error does not occur in the decoded word synchronization code, counting the code words n the second batch;

when the errors occur in the decoded word synchronization code, decoding the code words of the second batch and checking for errors in the decoded code words of the second batch, when the errors occur in the decoded code words of the second batch, checking whether the number of errors occurring in each decoded code word is less than a second predetermined number;

counting the code words in the second batch when number of the occurred errors is less than the second predetermined number;

returning to the step of detecting the preamble code when decoded code words in said batch represent data having a continuous logic state and the number of occurred errors is not less than said second predetermined number; and counting the code words in said second batch when the decoded code words in said second batch do not represent data having said continuous logic state and the number of occurred errors is not less than said second predetermined number.

21. A method for processing POCSAG data received by a paging receiver, said POCSAG data comprising a preamble code followed by a plurality of successive batch data, each batch data comprising a word synchronization code followed by a plurality of successive frame data, each frame data composing two code words representative of messages from a caller, said method comprising the steps of:

detecting said preamble code from said POCSAG data;

detecting a word synchronization code of a first batch data subsequent to said preamble code and making a first count of the number of code words in said first batch data, upon detection of said preamble code;

when said first count reaches a first predetermined number decoding a word synchronization code of a second batch data subsequent to said first batch data, and checking for errors occurring in said decoded word synchronization code of said second batch data;

when errors occur in the decoded word synchronization code of the second batch data, decoding the code words of the second batch data and checking for errors in the decoded code words of said second batch data:

when errors do not occur in said decoded code words of said second batch, making a second count of said decoded code words in said second batch data, and when errors occur in the decoded code words of said second batch data, checking whether the number of said decoded code words in which errors occur is greater than a second predetermined number;

determining whether said decoded code words in said second batch data represent data having a continuous logic state, when the number of said decoded code words is not greater than said second predetermined number;

returning to the step of detecting the word synchronization code of said first batch data, when the number of said decoded code words is greater than said second predetermined number;

returning to the step of detecting said preamble code from said POCSAG data when said decoded code words of said second batch data are determined to represent data having continuous logic state; and returning to the step of making said second count of the decoded code words in said second batch data when said code words in said second batch data are determined not to represent data having a continuous logic state.

* * * * *